(12) United States Patent
Lee et al.

(10) Patent No.: US 11,435,615 B2
(45) Date of Patent: Sep. 6, 2022

(54) OPTICAL DEVICE

(71) Applicant: LG Chem, Ltd., Seoul (KR)

(72) Inventors: Seong Min Lee, Daejeon (KR); Byoung Kun Jeon, Daejeon (KR); Nam Hun Kim, Daejeon (KR); Jung Woon Kim, Daejeon (KR); Young Shin Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/440,312

(22) PCT Filed: Mar. 26, 2020

(86) PCT No.: PCT/KR2020/004119
§ 371 (c)(1),
(2) Date: Sep. 17, 2021

(87) PCT Pub. No.: WO2020/197282
PCT Pub. Date: Oct. 1, 2020

(65) Prior Publication Data
US 2022/0146878 A1    May 12, 2022

(30) Foreign Application Priority Data
Mar. 27, 2019   (KR) ........................ 10-2019-0035032

(51) Int. Cl.
*G02F 1/1335*     (2006.01)
*G02F 1/1339*     (2006.01)

(52) U.S. Cl.
CPC ...... *G02F 1/133528* (2013.01); *G02F 1/1339* (2013.01)

(58) Field of Classification Search
CPC ................................................ G02F 1/133528
See application file for complete search history.

(56) References Cited

U.S. PATENT DOCUMENTS

| 2005/0237461 A1 | 10/2005 | Choi et al. |
| 2012/0019762 A1 | 1/2012 | Tanaka |

(Continued)

FOREIGN PATENT DOCUMENTS

| CN | 101135745 A | 3/2008 |
| JP | H01186911 A | 7/1989 |

(Continued)

OTHER PUBLICATIONS

International Search Report for PCT/KR2020/0041 19 dated Jun. 29, 2020. 3 pgs.

(Continued)

*Primary Examiner* — Edmond C Lau
(74) *Attorney, Agent, or Firm* — Lerner, David, Littenberg, Krumholz & Mentlik, LLP (57) ABSTRACT

An optical device that can be used for various applications including eyewears, such as sunglasses or AR (augmented reality) or VR (virtual reality) eyewear, an outer wall of a building or a sunroof for a vehicle, and the like is provided. The optical device includes first and second outer substrates disposed to face each other, an active liquid crystal film layer, and a step forming layer. The active liquid crystal film layer and the step forming layer are encapsulated by an encapsulating agent between the first and second outer substrate. The active liquid crystal film layer comprises a first region that is pressed by the step forming layer and a second region that is not pressed by the step forming layer. The defects caused by an excessively large or small amount of light-modulating material or heat shrinkage of the light-modulating material, and the like are prevented in the optical device.

14 Claims, 9 Drawing Sheets

(56) References Cited

U.S. PATENT DOCUMENTS

| | | | |
|---|---|---|---|
| 2013/0021545 A1 | 1/2013 | Song et al. | |
| 2015/0198830 A1 | 7/2015 | Galstian et al. | |
| 2015/0355483 A1* | 12/2015 | Lim .................. | G02F 1/133377 |
| | | | 349/86 |
| 2018/0321431 A1 | 11/2018 | Kim et al. | |
| 2019/0235301 A1 | 8/2019 | Park et al. | |
| 2021/0116748 A1 | 4/2021 | De Jong et al. | |

FOREIGN PATENT DOCUMENTS

| | | |
|---|---|---|
| JP | H08313889 A | 11/1996 |
| JP | 2000227601 A | 8/2000 |
| JP | 2001066612 A | 3/2001 |
| JP | 2008203518 A | 9/2008 |
| KR | 20060047183 A | 5/2006 |
| KR | 20130011420 A | 1/2013 |
| KR | 20170040564 A | 4/2017 |
| KR | 20180119517 A | 11/2018 |
| TW | 201901271 A | 1/2019 |

OTHER PUBLICATIONS

Search Report from Taiwan Application No. 109110398 dated Feb. 22, 2021. 1 pg.
Extended European Search Report including Written Opinion for Application No. 20777647.7 dated Apr. 13, 2022, pp. 1-7.

* cited by examiner

OPTICAL DEVICE

CROSS-REFERENCE TO RELATED APPLICATIONS

The present application is a national stage entry under 35 U.S.C. § 371 of International Application No. PCT/KR2020/004119 filed on Mar. 26, 2020, which claims priority from Korean Patent Application No. 10-2019-0035032 filed on Mar. 27, 2019, the disclosures of which are incorporated herein by reference in their entirety.

TECHNICAL FIELD

The present application relates to an optical device.

BACKGROUND ART

Various transmittance-variable devices designed so as to be capable of varying the transmittance using a liquid crystal compound are known. For example, an optical device using a so-called GH cell (guest host cell) to which a mixture of a host material and a dichroic dye guest is applied is known. Such a transmittance-variable device is applied to various applications including eyewear such as sunglasses or glasses, a building exterior wall or a sunroof of a vehicle, and the like.

In such a device, the liquid crystal layer comprises a liquid crystal material filled in a gap formed between two substrate layers disposed oppositely, and modulates light by adjusting the orientation of the liquid crystal material. Ideally, the liquid crystal material is completely filled in the space formed by the gap.

Figure 1:
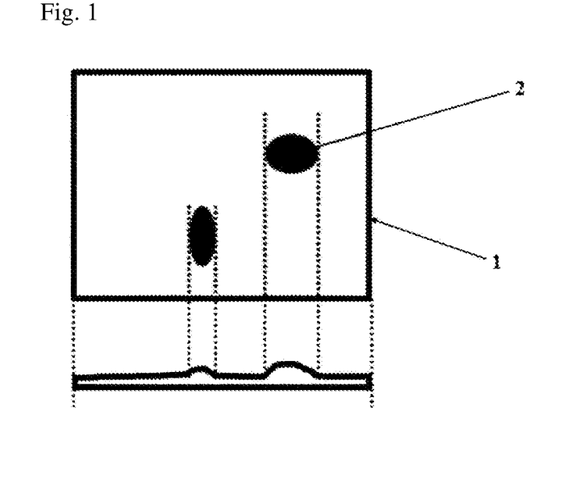
FIG. 1 is a view for explaining the problem of the existing active liquid crystal film layer.

For example, as shown in FIG. 1, if an excessive amount of liquid crystal material is present therein relative to the volume of the space by the gap, appearance defects may be caused by the liquid crystal material aggregated in the liquid crystal cell (1) by the excess liquid crystal material, or the convex portions (2) in the liquid crystal cell (1), and the like. Conversely, if a small amount of liquid crystal material is present therein relative to the volume of the space by the gap, appearance defects may also be caused by voids generated in the liquid crystal layer.

DISCLOSURE

Technical Problem

The present application provides an optical device. It is one object of the present application to provide an optical device that defects caused by an excessively large or small amount of light-modulating material or heat shrinkage of the light-modulating material, and the like are prevented.

Technical Solution

The present application provides an optical device. It is one object of the present application to provide an optical device that defects caused by an excessively large or small amount of light-modulating material or heat shrinkage of the light-modulating material, and the like are prevented.

Technical Solution

Among the physical properties mentioned herein, when the measurement temperature or pressure affects the result, the relevant physical property is measured at room temperature and normal pressure, unless otherwise specified.

The term room temperature is a natural temperature without warming or cooling, which may generally be any temperature in a range of about 10° C. to 30° C., or a temperature of about 23° C. or about 25° C. or so. In addition, unless otherwise specified, the temperature unit herein is ° C.

The term normal pressure is a natural pressure without particularly reducing or increasing, which generally means a pressure of 1 atm or so, such as atmospheric pressure.

The optical device of the present application is an optical device capable of adjusting transmittance, which may be, for example, an optical device capable of switching at least between a transparent mode and a black mode.

The transparent mode is a state where the optical device exhibits relatively high transmittance, and the black mode is a state where it has relatively low transmittance.

In one example, the optical device may have transmittance in the transparent mode of about 15% or more, about 18% or more, about 20% or more, about 25% or more, about 30% or more, about 35% or more, about 40% or more, about 45% or more, or about 50% or more. Furthermore, the optical device may have transmittance in the black mode of about 20% or less, about 15% or less, about 10% or less, about 5% or less, or about 1% or less or so.

The higher the transmittance in the transparent mode is, the more advantageous it is, and the lower the transmittance in the black mode is, the more advantageous it is, so that each of the upper limit and the lower limit is not particularly limited. In one example, the transmittance in the transparent mode may be about 100% or less, about 95% or less, about 90% or less, about 85% or less, about 80% or less, about 75% or less, about 70% or less, about 65% or less, or about 60% or less. The transmittance in the black mode may be about 0% or more, about 1% or more, about 2% or more, about 3% or more, about 4% or more, about 5% or more, about 6% or more, about 7% or more, about 8% or more, about 9% or more, or about 10% or more.

The transmittance may be linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. Therefore, the transmittance may be transmittance for ultraviolet light, visible light or near infrared light, depending on the target light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. If necessary, the optical device may also be designed to be capable of implementing other modes rather than the transparent and black modes, for example, various third modes, such as a mode which can represent any transmittance between the transmittance of the transparent mode and the transmittance of the black mode.

The switching between such modes can be achieved, as the optical device comprises an active liquid crystal film layer. Here, the active liquid crystal film layer is a liquid crystal element capable of switching between at least two or more oriented states of light axes, for example, first and second oriented states. Here, the optical axis may mean the long axis direction when the liquid crystal compound included in the active liquid crystal film layer is a rod type, and may mean the normal direction of the disc plane when it is a discotic type. For example, in the case where the active liquid crystal film layer comprises a plurality of liquid crystal compounds whose directions of the optical axes are different from each other in any oriented state, the optical axis of the active liquid crystal film layer may be defined as an average optical axis, and in this case, the average optical axis may mean the vector sum of the optical axes of the liquid crystal compounds.

In the active liquid crystal film layer, the oriented state may be changed by application of energy, for example, application of voltage. For example, the active liquid crystal film layer may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first oriented state, but the black mode may also be implemented in the second oriented state.

In the optical device of the present application, the active liquid crystal film layer may be encapsulated by an encapsulating agent between two outer substrates. In this specification, any one of the two outer substrates may be referred to as a first outer substrate, and the other may be referred to as a second outer substrate. However, the terms first and second as used above are the names for distinguishing two outer substrates, and do not define the sequential or vertical relationship between the two.

Here, the encapsulation is a state where the active liquid crystal film layer is surrounded by an encapsulating agent between two outer substrates. For example, all surfaces of the active liquid crystal film layer, for example, the top and bottom surfaces, and all sides may be surrounded by the encapsulating agent. Here, the fact that all the surfaces of the active liquid crystal film layer are surrounded by the encapsulating agent is that all the surfaces are substantially surrounded by the encapsulating agent, where connection parts, such as terminal parts formed so that an external power source may be applied for the switching of the active liquid crystal film layer, may come out of the encapsulating agent. In addition, all surfaces of the active liquid crystal film layer may also be in direct contact with the encapsulating agent, and other elements (for example, a polarizing layer or a step forming layer, and the like, as described below) may also exist between the surface of the active liquid crystal film layer and the encapsulating agent.

This encapsulation can be carried out with an adhesive, where the encapsulating agent can be an adhesive.

For example, while the encapsulating agent, which is an adhesive, attaches the outer substrate, the active liquid crystal film layer, the active liquid crystal film layer and/or other elements of the optical device (for example, a polarizing layer or a step forming layer) to each other, it may implement the encapsulating structure. For example, the structure may be implemented by a method of laminating an outer substrate, an active liquid crystal film layer, an adhesive film (which forms an encapsulating agent) and/or other elements according to the desired structure and then compressing them in a vacuum state.

As the adhesive, a known material may be used without particular limitation, and for example, known thermoplastic polyurethane (TPU: thermoplastic polyurethane) adhesives, TPS (thermoplastic starch) adhesives, polyamide adhesives, acrylic adhesives, polyester adhesives, EVA (ethylene vinyl acetate) adhesives, polyolefin adhesives such as polyethylene or polypropylene, or polyolefin elastomer adhesives (POE adhesives), and the like may be used. Such an adhesive may be in the form of a film.

The optical device may comprise a step forming layer encapsulated by an encapsulating agent between the first and second outer substrates together with the active liquid crystal film layer. The step forming layer may be disposed on at least one surface of the active liquid crystal film layer. The term step forming layer may mean a layer that forms a step difference of a so-called cell gap in at least a certain portion of the active liquid crystal layer. That is, both the step forming layer and the active liquid crystal film layer have structures encapsulated between two outer substrates, and thus when the area of the step forming layer and the active liquid crystal film layer is adjusted, the step may be formed, as at least a part of the region of the active liquid crystal film layer is pressed by the step forming layer. As an excessive amount of light-modulating material and/or voids existing in the cell gap of the active liquid crystal film layer are pushed out by the pressing force due to such a structure, a structure, in which in the region pressed by the step forming layer, the light-modulating material ideally fills the space by the cell gap, can be implemented.

Figure 2:
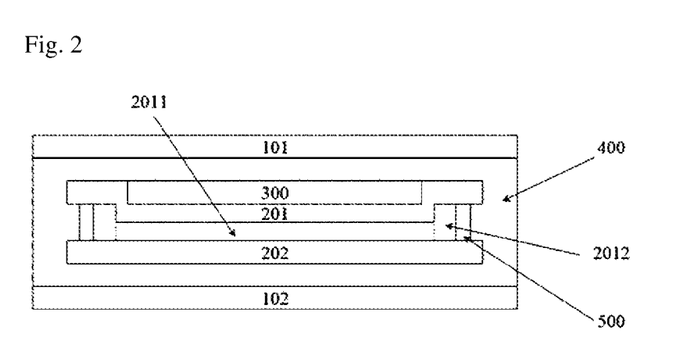
FIGS. 2 to 6 are exemplary views for explaining the optical device of the present application.

FIG. 2 is a side view of an exemplary optical device, wherein the device comprises an active liquid crystal film layer and a step forming layer (300) encapsulated by an encapsulating agent (400) between two outer substrates (101, 102).

As shown in FIG. 2, the active liquid crystal film layer may comprise two base film layers (201, 202) disposed oppositely. The two base film layers (201, 202) are bonded together so as to form gaps by a so-called sealant (500), where a liquid crystal material is present in the gaps. As described below, a so-called anisotropic dye may also be present together with the liquid crystal material in the spaces of the gaps. As shown in FIG. 2, in the active liquid crystal film layer, a region (2011) pressed by the step forming layer (300) and a un-pressed region (2012) are generated by the action of the step forming layer (300) and the encapsulating agent (400). In this structure, an excess amount of a light-modulating material (liquid crystal material and/or anisotropic dye, etc.) or bubbles, and the like move to the un-pressed region (2012), and an ideal state is realized in the pressed region (2011). In FIG. 2, the dotted line existing between the pressed region (2011) and the un-pressed region (2012) is a virtual line for distinguishing the regions only on the drawing. In addition, according to the above structure, the so-called white spot problem caused by the depletion of the light-modulating material generated by heat shrinkage of the light-modulating material such as a liquid crystal material depending on the use state of the optical device can also be solved.

Figure 3:
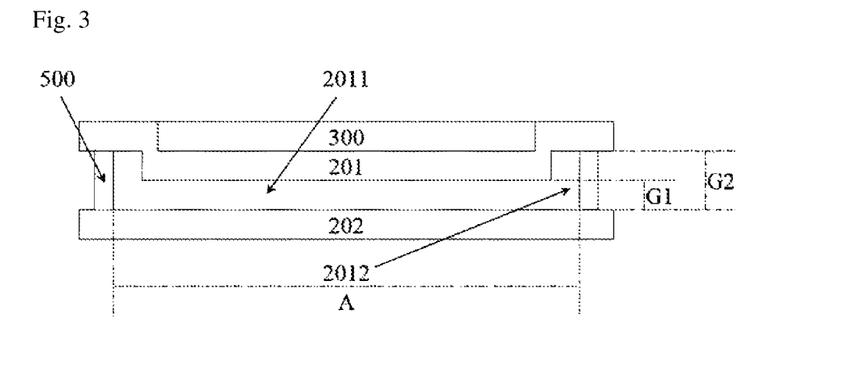

FIG. 3 is a view separately showing the active liquid crystal film layer and the step forming layer (300) in FIG. 2.

As shown in FIG. 3, in the above structure, the gaps (so-called cell gaps) of the two base film layers oppositely disposed in the active liquid crystal film layer are different from each other in the region (2011) pressed by the step forming layer and the un-pressed region (2012).

In one example, the ratio (100×G1/G2) of the gap (G1 in FIG. 3) of the base film layers (201, 202) in the region (2011) pressed by the step forming layer to the gap (G2 in FIG. 3) of the base film layers (201, 202) in the un-pressed region (2012) may be in a range of approximately 10% to 95% or so. In another example, the ratio (100×G1/G2) may be 11% or more or so, 12% or more or so, 13% or more or so, 14% or more or so, 15% or more or so, 16% or more or so, 17% or more or so, 18% or more or so, 19% or more or so, 20% or more or so, 21% or more or so, 22% or more or so, 23% or more or so, 24% or more or so, 25% or more or so, 26% or more or so, 27% or more or so, 28% or more or so, 29% or more or so, 30% or more or so, 31% or more or so, 32% or more or so, 33% or more or so, 34% or more or so, 35% or more or so, 36% or more or so, 37% or more or so, 38% or more or so, 39% or more or so, 40% or more or so, 41% or more or so, 42% or more or so, 43% or more or so, 44% or more or so, 45% or more or so, 46% or more or so, 47% or more or so, 48% or more or so, 49% or more or so, 50% or more or so, 51% or more or so, 52% or more or so, 53% or more or so, 54% or more or so, 55% or more or so, 56% or more or so, 57% or more or so, 58% or more or so, 59% or more or so, 60% or more or so, 61% or more or so, 62% or more or so, 63% or more or so, 64% or more or so, 65% or more or so, 66% or more or so, 67% or more or so, 68% or more or so, 69% or more or so, 70% or more or so, 71% or more or so, 72% or more or so, 73% or more or so, 74% or more or so, 75% or more or so, 76% or more or so, 77% or more or so, 78% or more or so, 79% or more or so, 80% or more or so, 81% or more or so, 82% or more or so, 83% or more or so, 84% or more or so, 85% or more or so, 86% or more or so, 87% or more or so, 88% or more or so, 89% or more or so, 90% or more or so, 91% or more or so, 92% or more or so, 93% or more or so, 94% or more or so, or may also be 94% or less or so, 93% or less or so, 92% or less or so, 91% or less or so, 90% or less or so, 89% or less or so, 88% or less or so, 87% or less or so, 86% or less or so, 85% or less or so, 84% or less or so, 83% or less or so, 82% or less or so, 81% or less or so, 80% or less or so, 79% or less or so, 78% or less or so, 77% or less or so, 76% or less or so, 75% or less or so, 74% or less or so, 73% or less or so, 72% or less or so, 71% or less or so, 70% or less or so, 69% or less or so, 68% or less or so, 67% or less or so, 66% or less or so, 65% or less or so, 64% or less or so, 63% or less or so, 62% or less or so, 61% or less or so, 60% or less or so, 59% or less or so, 58% or less or so, 57% or less or so, 56% or less or so, 55% or less or so, 54% or less or so, 53% or less or so, 52% or less or so, or 51% or less or so.

Such a ratio can be adjusted by, for example, controlling the cell gap of the active liquid crystal film layer, the thickness of the step forming layer and/or the encapsulation pressure by the encapsulation agent, and the like.

In one example, in the above structure, the ratio (100× A2/A1) of the area (A2) of the step forming layer to the area (A1) of the active liquid crystal film layer may be in a range from 70% to 98%. The ratio (100×A2/A1) may be 71% or more or so, 72% or more or so, 73% or more or so, 74% or more or so, 75% or more or so, 76% or more or so, 77% or more or so, 78% or more or so, 79% or more or so, 80% or more or so, 81% or more or so, 82% or more or so, 83% or more or so, 84% or more or so, 85% or more or so, 86% or more or so, 87% or more or so, 88% or more or so, 89% or more or so, 90% or more or so, 91% or more or so, 92% or more or so, 93% or more or so, 94% or more or so, 95% or more or so, 96% or more or so, or 97% or more or so, or may be 97% or less or so, 96% or less or so, 95% or less or so, 94% or less or so, 93% or less or so, 92% or less or so, 91% or less or so, 90% or less or so, 89% or less or so, 88% or less or so, 87% or less or so, 86% or less or so, 85% or less or so, 84% or less or so, 83% or less or so, 82% or less or so, 81% or less or so, 80% or less or so, 79% or less or so, 78% or less or so, 77% or less or so, 76% or less or so, 75% or less or so, 74% or less or so, 73% or less or so, 72% or less or so, or 71% or less or so. The area is an area when the active liquid crystal film layer and the step forming layer have each been observed from the top or bottom surface. In addition, the area of the active liquid crystal film layer may be the entire area of the film layer or the area of the region (A in FIG. 3) formed inside the sealant (500).

Through the control of the ratio, the volume of the region un-pressed by the step forming layer in the cell gap of the active liquid crystal film layer may be adjusted so that the excess amount of the light-modulating material and/or bubbles may be properly pushed out.

In such a structure, the surface of the region of the active liquid crystal film layer pressed by the step forming layer may form a light modulation region in the optical device, that is, a region where the transmittance is adjusted in one example.

Figure 4:
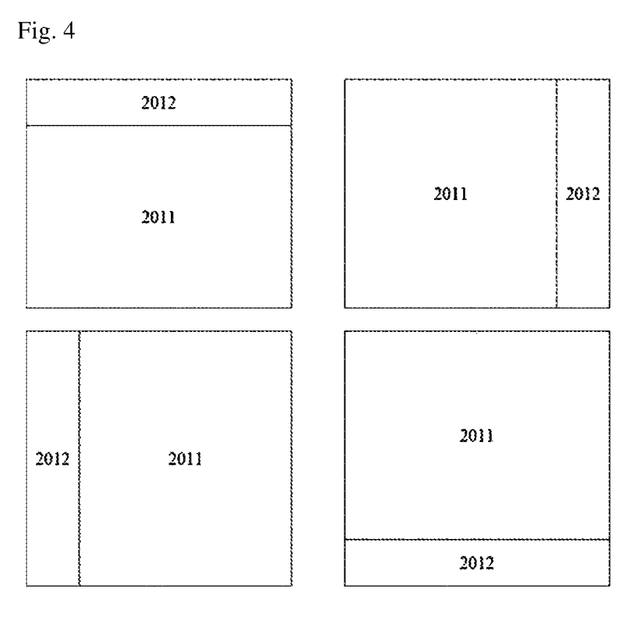

In the active liquid crystal film layer, the two regions (2011, 2012) may exist in various forms. For example, as exemplarily shown in FIG. 4, when observed from the top or bottom surface, the region (2012) of the active liquid crystal film layer un-pressed by the step forming layer may exist on at least one edge of the region (2011) pressed by the step forming layer.

Figure 5:
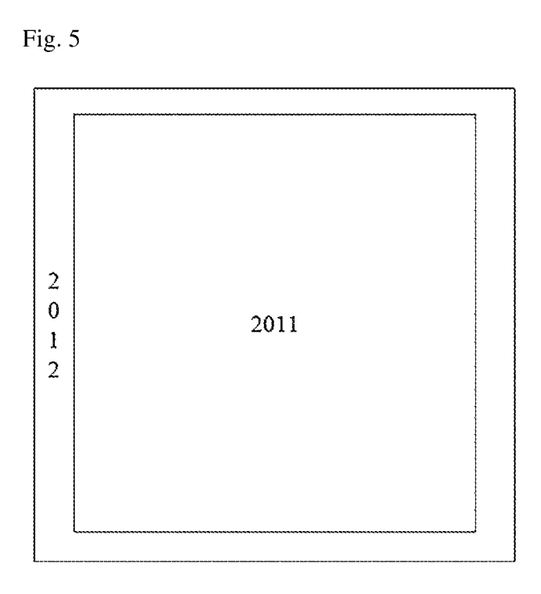

In another example, as shown in FIG. 5, the region (2012) of the active liquid crystal film layer un-pressed by the step forming layer when viewed from the top or bottom surface may be formed as a bezel around the region (2011) of the active liquid crystal film layer pressed by the step forming layer.

The form may be changed according to the purpose. For example, the above contents may be changed in consideration of the desired volume of the region (2012) un-pressed by the step forming layer or the design of the optical device, and the like.

The specific type of each constitution applied in the above-described structure is not particularly limited, and a known constitution may be applied.

For example, in one example, as the light-modulating material included in the gap between the base film layers of the active liquid crystal film layer, a liquid crystal material may be typically applied, where the type of the specific liquid crystal material is not particularly limited.

In one example, the active liquid crystal film layer may be a so-called guest host liquid crystal film layer. In this case, an anisotropic dye may be included together with a liquid crystal material (liquid crystal host) in the gap. Such a liquid crystal film layer comprises, as a liquid crystal layer using a so-called guest host effect, a liquid crystal layer in which the anisotropic dye is aligned according to an orientation direction of the liquid crystal material (liquid crystal host). The orientation direction of the liquid crystal host may be adjusted according to the application of the above-described external energy.

As such a liquid crystal host, a general kind of liquid crystal compound applied for realizing the guest host effect may be used without particular limitation.

For example, as the liquid crystal host, a smectic liquid crystal compound, a nematic liquid crystal compound, or a cholesteric liquid crystal compound may be used. Such a liquid crystal compound may be in a rod form or may be in a discotic form.

As such a liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a liquid crystal phase such as nematic, can be selected. In one example, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3 or more than 7, or may be less than −2 or less than −3.

The liquid crystal compound may have optical anisotropy ($\beta n$) of about 0.01 or more, or about 0.04 or more. In another example, the optical anisotropy of the liquid crystal compound may be about 0.3 or less, or about 0.27 or less.

Liquid crystal compounds that can be used as the liquid crystal host of the guest host liquid crystal layer are known to experts in the art, which can be freely selected therefrom.

In the case of a so-called guest host liquid crystal film layer, the liquid crystal layer (gaps formed between two base film layers) may comprise an anisotropic dye together with the liquid crystal host. The term "dye" may mean a material capable of intensively absorbing and/or modifying light in at least a part or the entire range in a visible light region, for example, a wavelength range of 380 nm to 780 nm, and the term "anisotropic dye" may mean a material capable of anisotropic absorption of light in at least a part or the entire range of the visible light region.

As the anisotropic dye, for example, known dyes known to have properties that can be aligned according to the aligned state of the liquid crystal host may be selected and used. For example, azo dyes or anthraquinone dyes and the like may be used as the anisotropic dye, and the liquid crystal layer may also comprise one or two or more dyes in order to achieve light absorption in a wide wavelength range.

A dichroic ratio of the anisotropic dye may be appropriately selected in consideration of the purpose. For example, the anisotropic dye may have a dichroic ratio of 5 or more to 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The anisotropic dye may have the dichroic ratio at least at some wavelengths or at any one wavelength or full range in the wavelength range of the visible region, for example, in the wavelength range of about 380 nm to 780 nm or about 400 nm to 700 nm.

The content of the anisotropic dye in the liquid crystal layer may be appropriately selected in consideration of the purpose. For example, the content of the anisotropic dye may be selected in a range of 0.1 to 10 weight % based on the total weight of the liquid crystal host and the anisotropic dye. The ratio of the anisotropic dye may be changed in consideration of the desired transmittance and the solubility of the anisotropic dye in the liquid crystal host, and the like.

The liquid crystal layer basically comprises the liquid crystal host and the anisotropic dye, and may further comprise other optional additives according to a known form, if necessary. As an example of the additive, a chiral dopant or a stabilizer can be exemplified, without being limited thereto.

The thickness of the liquid crystal layer (the thickness of the cell gap) may be appropriately selected in consideration of the purpose, for example, the desired degree of anisotropy and the like. In one example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. By controlling the thickness as such, it is possible to implement an optical device having a large difference between transmittance in a transparent state and transmittance in a black state, that is, a device having a large contrast ratio. As the thickness is thicker, the higher contrast ratio can be implemented, thereby being not particularly limited, but it may be generally about 30 μm or less, 25 μm or less, 20 μm or less, or 15 μm or less. Here, the thickness is also the thickness of the region pressed by the step forming layer.

The active liquid crystal film layer may switch between a first oriented state and a second oriented state different from the first oriented state. The switching can be controlled, for example, by the application of external energy, such as a voltage. For example, either of the first and second oriented states may be maintained in a state where a voltage is not applied and then switched to another oriented state by voltage application.

In one example, the first and second oriented states may be each selected from a horizontal orientation, vertical orientation, twisted nematic orientation, or cholesteric orientation state. For example, in the black mode, the active liquid crystal film layer or the liquid crystal layer may be at least in horizontal orientation, twisted nematic orientation or cholesteric orientation, and in the transparent mode, the active liquid crystal film layer or the liquid crystal layer may be in a vertically oriented state, or a horizontally oriented state having optical axes of directions different from the horizontal orientation of the black mode. The active liquid crystal film layer may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as P-2000 from Jasco.

A method of realizing the active liquid crystal film layer of the normally transparent or black mode by adjusting the dielectric constant anisotropy of the liquid crystal host, the orientation direction of the alignment film for orienting the liquid crystal host, and the like is known.

As described above, the active liquid crystal film layer may comprise two base film layers disposed oppositely. The active liquid crystal film layer may further comprise a spacer maintaining the gap of the two base film layers between the two base film layers and/or a sealant attaching the base film layers in a state where the gap of the two base film layers disposed oppositely is maintained. As the spacer and/or sealant, a known material can be used without particular limitation.

As the base film layer, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the base film layer, if necessary.

Among various materials as mentioned above, one capable of being pressed by the step forming layer may be suitably used as the base film layer.

The thickness of the base film layer is not particularly limited, which may be, for example, in a range of about 50 μm to 200 μm or so.

In the active liquid crystal film layer, a conductive layer and/or an alignment film may be present on one surface of the base film layer, for example, the surface of the base film layer facing the active liquid crystal film layer.

The conductive layer present on the surface of the base film layer is a constitution for applying a voltage to the active liquid crystal film layer, where a known conductive layer may be applied without particular limitation. As the conductive layer, for example, a conductive polymer, a conductive metal, a conductive nanowire, or a metal oxide such as ITO (indium tin oxide), and the like may be applied. In the present application, an example of the applicable conductive layer is not limited to the above, and all kinds of conductive layers known to be applicable to the active liquid crystal film layer in this field may be used.

In one example, an alignment film is present on the surface of the base film layer. For example, a conductive layer may be first formed on one surface of the base film layer, and an alignment film may be formed on the top. The alignment film is a constitution for controlling the orientation of the liquid crystal host included in the active liquid crystal film layer, where a known alignment film may be applied without particular limitation. The alignment film known in the industry includes a rubbing alignment film or a photo-alignment film, and the like, and the alignment film that can be used in the present application is the known alignment film, which is not particularly limited.

The orientation direction of the alignment film can be controlled to achieve the proper orientation of the optical axis. For example, the orientation directions of two alignment films formed on each side of two base film layers disposed opposite to each other may form an angle in a range of about −10 degrees to 10 degrees, an angle in a range of −7 degrees to 7 degrees, an angle in a range of −5 degrees to 5 degrees or an angle in a range of −3 degrees to 3 degrees to each other, or may be approximately parallel to each other. In another example, the orientation directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or may be approximately perpendicular to each other.

Since the direction of the optical axis of the active liquid crystal film layer is determined in accordance with such an orientation direction, the orientation direction can be confirmed by checking the direction of the optical axis of the active liquid crystal film layer.

The shape of the active liquid crystal film layer having such a constitution is not particularly limited, which may be determined according to the applied use of the optical device, and it is generally in the form of a film or sheet.

The type of the step forming layer included in the optical device is also not particularly limited. For example, all transparent materials having an appropriate thickness in the optical device, thereby being capable of forming the step, may be used as the step forming layer.

In one example, the step forming layer may be a transparent polymer film. Here, the term transparency may mean a state where the above-mentioned linear light transmittance is about 30% or more, about 35% or more, about 40% or more, about 45% or more, about 50% or more, or is about 100% or less, about 95% or less, about 90% or less, about 85% or less, about 80% or less, about 75% or less, about 70% or less, about 65% or less, or about 60% or less. The reference light at this time may be ultraviolet light, visible light or near infrared light, and the like, and in one example, it may be light having a wavelength of approximately 550 nm.

Various materials are known as the transparent polymer film, and for example, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto.

A curable or plastic resin layer may be applied as the step forming layer. That is, the step forming layer may be formed by applying a curable or plastic resin composition or the like to form a layer so that a step may be formed at an appropriate thickness in an appropriate position in the optical device. At this time, if it exhibits the above-mentioned transparency for the curable or plastic resin layer, it may be applied without particular limitation, and for example, usually a curable or plastic resin layer capable of forming an adhesive resin layer or a pressure-sensitive adhesive resin layer, or any other curable or plastic resin layer may be applied. For example, the material for forming the curable or plastic resin layer may be exemplified by an epoxy-based: acrylate-based, urethane-based, rubber-based or silicon-based oligomer or polymer material, and the like, but is not limited thereto.

The thickness of the step forming layer can be controlled by those skilled in the art according to the desired step. For example, the thickness may be about 5 μm or more, 10 μm or more, 15 μm or more, 20 μm or more, 25 μm or more, 30 μm or more, 35 μm or more, or 40 μm or more or so, or may be about 300 μm or less or so, 280 μm or less or so, 260 μm or less or so, 240 μm or less or so, 220 μm or less or so, 200

μm or less or so, 180 μm or less or so, 160 μm or less or so, 140 μm or less or so, 120 μm or less or so, or 100 μm or less or so, but this may be changed depending on the purpose.

The type of the outer substrate applied to the optical device is also not particularly limited. As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film;

a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

When the outer substrate has optical anisotropy, the angle formed by the slow axes of the outer substrates disposed oppositely may be, for example, in a range of about −10 degrees to 10 degrees, in a range of −7 degrees to 7 degrees, in a range of −5 degrees to 5 degrees or in a range of −3 degrees to 3 degrees, or approximately parallel.

The thickness of the outer substrate is not particularly limited, and for example, may be about 0.3 mm or more. In another example, the thickness may be about 0.5 mm or more, about 0.7 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, 3 mm or less, about 2 mm or less, or about 1 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape. Here, in the case of having the curved surface shape at the same time, the respective curvatures or curvature radii may be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

In relation to the substrate, for example, when the curvatures or curvature radii on the front surface and the back surface are different, the respective curvatures or curvature radii of the opposing surfaces, that is, the curvature or curvature radius of the surface facing the second outer substrate in the case of the first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius, or the smallest curvature or curvature radius, or the average curvature or average curvature radius may be a reference.

Both of the substrates may have a difference in curvature or curvature radius within 10%, within 9%, within 8%, within 7%, within 6%, within 5%, within 4%, within 3%, within 2% or within 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the curvatures or curvature radii of two outer substrates can be the same, the difference in curvature or curvature radius may be 0% or more, or more than 0%.

The control of such a curvature or curvature radius is useful in a structure in which an active liquid crystal film layer and the like are encapsulated by an adhesive film as in the optical device of the present application.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

The specific range of each curvature or curvature radius of the first and second outer substrates is not particularly limited. In one example, the curvature radius of each substrate may be 100R or more, 200R or more, 300R or more, 400R or more, 500R or more, 600R or more, 700R or more, 800R or more, or 900R or more, or may be 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or 1,050R or less. Here, R denotes a curved gradient of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one example, when the curvatures of the first and second outer substrates are different from each other, the curvature radius of the substrate having a large curvature among them may be within the above range. In one example, when the curvatures of the first and second outer substrates are different from each other, a substrate having a large curvature among them may be a substrate that is disposed in the gravity direction upon using the optical device.

That is, for the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal film layer, and bubbles may be formed inside. However, when the curvatures or curvature radii between the substrates are controlled as described above, the net force which is the sum of the restoring force and the gravity may act to prevent the widening and also to withstand the same process pressure as the autoclave, even if the adhesion force by the adhesive film is lowered.

Figure 6:
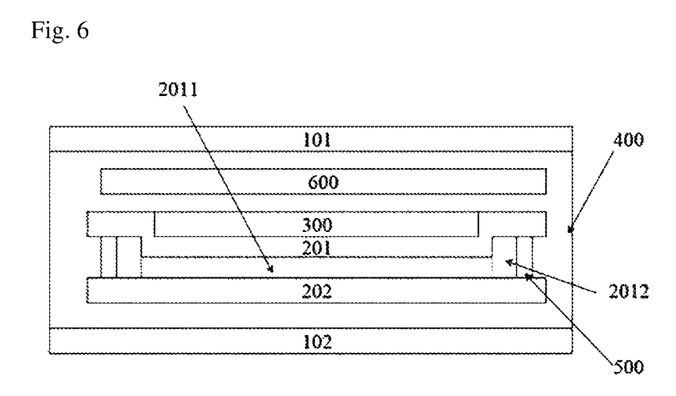

The optical device may further comprise a polarizing layer together with the active liquid crystal film layer. Such a polarizing layer may also be encapsulated by an encapsulating agent. FIG. 6 is a view when the polarizing layer (600) is added in the structure of FIG. 2. As in the drawing, the polarizing layer (600) may be disposed on at least one side of the active liquid crystal film layer. However, as described below, the step forming layer (300) itself may be the polarizing layer, and in this case, the structure of the optical device may be formed as shown in FIG. 2. As the polarizing layer, for example, an absorption type linear polarizing layer, that is, a polarizing layer having a light absorption axis formed in one direction and a light transmission axis formed substantially perpendicular thereto may be used.

Assuming that the blocking state is implemented in the first oriented state of the active liquid crystal film layer, the polarizing layer may be disposed on the optical device such that the angle formed by the average optical axis (vector sum of optical axes) at the first oriented state and the light absorption axis of the polarizing layer is 80 degrees to 100 degrees or 85 degrees to 95 degrees, or it is approximately perpendicular, or may be disposed on the optical device such that it is 35 degrees to 55 degrees or about 40 degrees to 50 degrees or approximately 45 degrees.

When the orientation direction of the alignment film is used as a reference, the orientation directions of the alignment films formed on each side of the two base film layers of the active liquid crystal film layer disposed opposite to each other as described above may form, to each other, an angle in a range of about −10 degrees to 10 degrees, an angle in a range of −7 degrees to 7 degrees, an angle in a range of −5 degrees to 5 degrees or an angle in a range of −3 degrees to 3 degrees, or in the case of being approximately parallel to each other, the angle formed by the orientation direction of any one of the two alignment films and the light absorption axis of the polarizing layer may be 80 degrees to 100 degrees or 85 degrees to 95 degrees, or may be approximately perpendicular.

In another example, the orientation directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or in the case of being approximately vertical to each other, the angle formed by the orientation direction of the alignment film disposed closer to the polarizing layer of the two alignment films and the light absorption axis of the polarizing layer may be 80 degrees to 100 degrees or 85 degrees to 95 degrees, or may be approximately perpendicular.

For example, as shown in FIG. 6, the active liquid crystal film layer and the polarizing layer may be disposed in a state of being laminated with each other such that the optical axis (average optical axis) in the first orientation direction of the active liquid crystal film layer and the light absorption axis of the polarizing layer become the above relationship. In one example, when the polarizing layer is a polarizing coating layer to be described below, a structure that the polarizing coating layer exists inside the active liquid crystal film layer may also be implemented. For example, the above-described conductive layer, the polarizing coating layer and the alignment film may be sequentially formed on at least one base film layer.

The kind of the polarizing layer that can be applied in the optical device of the present application is not particularly limited. For example, as the polarizing layer, a conventional material used in conventional LCDs or the like, such as a PVA (poly(vinyl alcohol)) polarizing layer, or a polarizing layer implemented by a coating method such as a polarizing coating layer comprising lyotropic liquid crystals (LLCs) or reactive mesogens (RMs) and a dichroic dye can be used. In this specification, the polarizing layer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of 30 to 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only one active liquid crystal film layer and one polarizing layer as described above. Accordingly, the optical device may comprise only one active liquid crystal film layer and only one polarizing layer.

In one example, by adjusting the area and thickness of the polarizing layer itself, the polarizing layer may also act as the step forming layer.

The optical device may further comprise any necessary configuration other than the above configurations, and for example, comprise a known configuration such as a retardation layer, an optical compensation layer, an antireflection layer and a hard coating layer in a proper position.

Such an optical device may be produced in any way. For example, the optical device may be produced by laminating the outer substrate, the adhesive film (constituting the encapsulating agent), the step forming layer, the active liquid crystal film layer and/or other components according to a desired structure and then applying the laminate to a pressing process such as an autoclave process. In this process, a desired structure may be formed by the step forming layer and pressing.

At this time, the production of the laminate may be performed, for example, by applying a known lamination technique.

Subsequently, the encapsulation may be completed through a bonding process, for example, an autoclave process. The conditions of the autoclave process are not particularly limited, and it may be performed under an appropriate temperature and pressure, for example, depending on the type of the applied adhesive film. The temperature of a typical autoclave process is about 80° C. or more, 90° C. or more, 100° C. or more, and the pressure is 2 atm or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including an auto body in which at least one opening is formed, the optical device or the sunroof for a vehicle attached to the opening can be mounted and used.

At this time, when the curvatures or curvature radii of the outer substrates are different from each other, a substrate having a smaller curvature radius, that is, a substrate having a larger curvature, can be arranged in the gravity direction.

Advantageous Effects

The present application provides an optical device that can be used for various applications of eyewear such as sunglasses or AR (augmented reality) or VR (virtual reality) eyewear, an outer wall of a building or a sunroof for a vehicle, and the like. It is one object of the present application to provide an optical device that defects caused by an excessively large or small amount of light-modulating material or heat shrinkage of the light-modulating material, and the like are prevented.

MODE FOR THE DISCLOSURE

Hereinafter, the present application will be described in detail through examples and comparative examples, but the scope of the present application is not limited to the following examples.

Example 1

An optical device was produced by encapsulating a guest-host active liquid crystal film layer (cell gap: about 12 μm, base film layer type: PET (poly(ethylene terephthalate)) film, liquid crystal/dye mixture type: a mixture of Merck's MAT-16-969 liquid crystals and a anisotropic dye (BASF, X12)) as an active liquid crystal film layer and a PVA (polyvinyl alcohol) film-based polarizing layer (thickness: about 100 μm) between two outer substrates with a thermoplastic polyurethane adhesive film (thickness: about 0.38 mm, manufacturer: Argotec, product name: ArgoFlex).

Here, a glass substrate having a thickness of about 3 mm or so was used as the outer substrate, and the curvature radius of the two outer substrates was approximately 4,000R or so.

Here, a rectangular film layer having a horizontal length of about 850 mm and a vertical length of about 600 mm at the time of observing from the top was applied as the active liquid crystal film layer and a rectangular film layer having a horizontal length of about 830 mm and a vertical length of about 580 mm at the time of observing from the top was applied as the PVA film-based polarizing layer. Here, the horizontal and vertical lengths of the active liquid crystal film layer are the lengths of the inner region of the sealant that maintains the gap between the base film layers.

The first outer substrate (101), the adhesive film (forming the encapsulating agent (400)), the polarizing layer (300), the active liquid crystal film layer, the adhesive film (forming the encapsulating agent (400)) and the second outer substrate (102) were disposed so that the structure shown in FIG. 2 was formed, and the adhesive film (forming the encapsulating agent (400)) was also disposed on the side surfaces of the active liquid crystal film layer and the polarizing layer. Here, the polarizing layer and the active liquid crystal film layer were disposed so that their centers coincided from each other.

Subsequently, an autoclave process was performed at a temperature of about 100° C. and a pressure of about 2 atm or so to produce an optical device.

Example 2

An optical device was produced in the same manner as in Example 1, except that the polarizing layer was not applied as the step forming layer, and a separate polymer film was applied as the step forming layer. In Example 2, the film having the same horizontal and vertical lengths as those of the active liquid crystal film layer (width: about 850 mm, height: about 600 mm or so) was applied as the polarizing layer. As the polymer film to form the step forming layer, a PET (poly(ethylene terephthalate)) film was applied, and a separate polymer film was disposed on the outside of the active liquid crystal film layer in consideration of the anisotropy of the PET film. The added film had a horizontal length of about 830 mm, a vertical length of about 580 mm and a thickness in a range of about 40 to 95 μm at the time of observing from the top. Other constitutions used except for the polarizing layer and the PET film were the same as those of Example 1.

The first outer substrate (101), the adhesive film (forming the encapsulating agent (400)), the polarizing layer (600), the active liquid crystal film layer, the PET film (300), the adhesive film (forming the encapsulating agent (400)) and the second outer substrate (102) were disposed so that the structure shown in FIG. 6 was formed, and the adhesive film (forming the encapsulating agent (400)) was also disposed on the side surfaces of the active liquid crystal film layer and the polarizing layer. Here, the polarizing layer, the PET film and the active liquid crystal film layer were disposed so that their centers coincided from one another.

Subsequently, an autoclave process was performed at a temperature of about 100° C. and a pressure of about 2 atm or so to produce an optical device.

Comparative Example 1

An optical device was produced in the same manner as in Example 1, except that a PVA film of the same area with the same horizontal and vertical lengths as those of the active liquid crystal film layer was applied as the polarizing layer.

Figure 7:
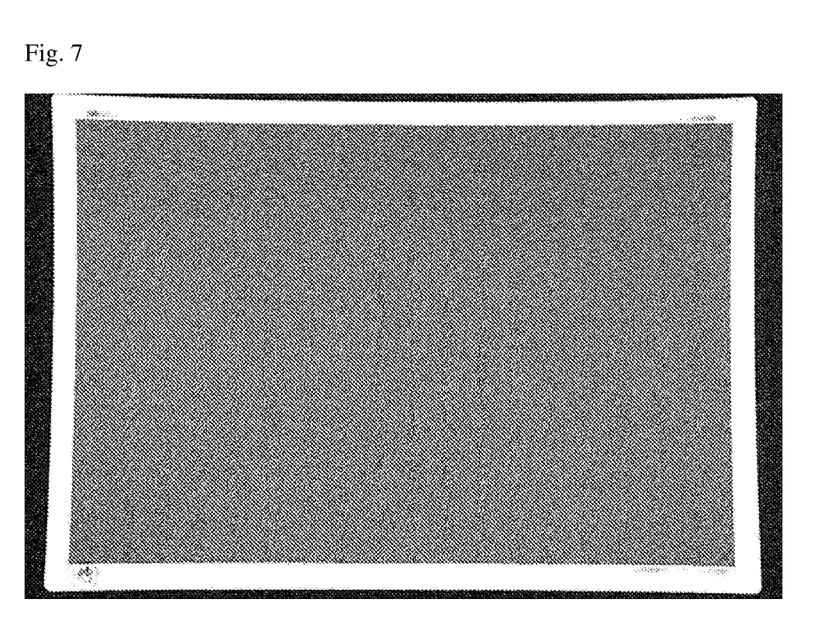
FIGS. 7 and 8 are views observing the appearance of the optical devices of Examples 1 and 2, respectively.
Figure 8:
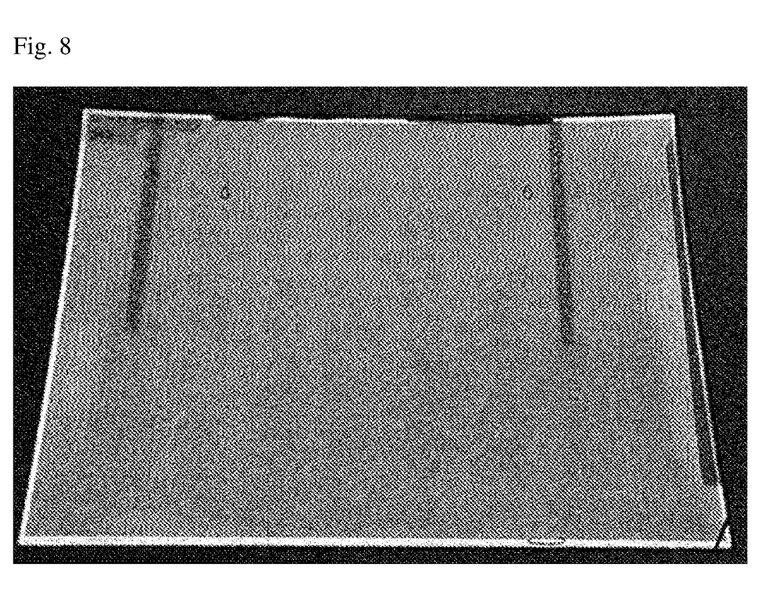
Figure 9:
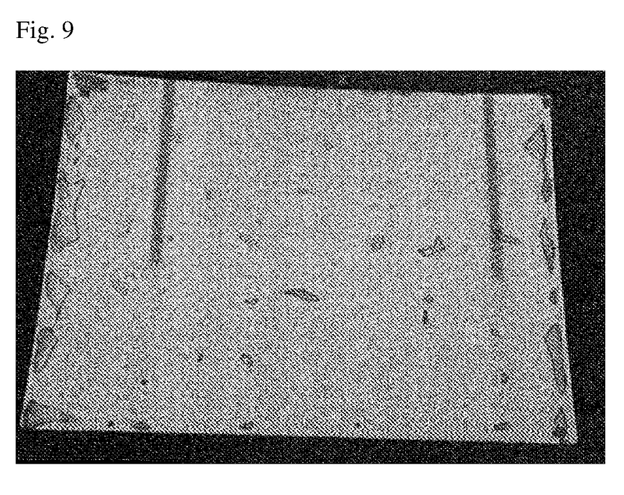
FIG. 9 is a view observing the appearance of the optical device of Comparative Example 1.

FIGS. 7 and 8 are photographs confirming the appearance of the optical devices of Examples 1 and 2, respectively, and FIG. 9 is a photograph confirming the appearance of the optical device of Comparative Example 1. As in the drawings, in the case of Examples 1 and 2, defects were not observed in the region pressed by the step forming layer, but in the case of Comparative Example 1, a number of defects such as stains were confirmed.

The invention claimed is:

1. An optical device, comprising:
   first and second outer substrates disposed so as to face each other;
   an active liquid crystal film layer; and
   a step forming layer,
   wherein the active liquid crystal film layer and the step forming layer are encapsulated by an encapsulating agent between the first and second outer substrate, and
   wherein the active liquid crystal film layer comprises a first region that is pressed by the step forming layer and a second region that is not pressed by the step forming layer.

2. The optical device according to claim 1, wherein the active liquid crystal film layer comprises:
   two base film layers disposed to face each other; and
   a liquid crystal material in a gap between the base film layers.

3. The optical device according to claim 2, wherein an anisotropic dye is further comprised in the gap between the base film layers.

4. The optical device according to claim 2, wherein a size of the gap between the two base film layers facing each other in the first region of the active liquid crystal film layer is different from a size of the gap between the two base film layers facing each other in the second region of the active liquid crystal film layer.

5. The optical device according to claim 4, wherein a ratio $100\times(G1/G2)$ of a size $G1$ of the gap in the first region with respect to a size $G2$ of the gap in the second region is from 10% to 95%.

6. The optical device according to claim 1, wherein a ratio $100\times(A2/A1)$ of an area $A2$ of the step forming layer with respect to an area $A1$ of the active liquid crystal film layer is from 70% to 98%.

7. The optical device according to claim 1, wherein the first region of the active liquid crystal film layer forms a light modulation region.

8. The optical device according to claim 1, wherein the second region of the active liquid crystal film layer exits in at least one edge of the first region, which is pressed by the step forming layer, of the active liquid crystal film layer.

9. The optical device according to claim 1, wherein the second region of the active liquid crystal film layer forms a bezel around the first region of the active liquid crystal film layer.

10. The optical device according to claim 1, wherein the step forming layer is a transparent polymer film layer, a plastic resin layer or a curable resin layer.

11. The optical device according to claim 1, further comprising a polarizing layer encapsulated by the encapsulating agent between the first and second outer substrates.

12. The optical device according to claim 11, wherein the polarizing layer acts as the step forming layer.

13. The optical device according to claim 1, wherein at least one of the first and second outer substrates is a curved surface substrate.

14. The optical device according to claim 13, wherein a difference in curvatures of the first and second outer substrates is 10% or less.

* * * * *